United States Patent [19]
Grove

[11] 3,954,199
[45] May 4, 1976

[54] BOAT HANDLING APPARATUS FOR STOWING BOATS ABOARD OVERLAND VEHICLES

[76] Inventor: Russell E. Grove, 5679 N. Van Ness Blvd., Fresno, Calif. 93705

[22] Filed: Apr. 24, 1975

[21] Appl. No.: 571,421

[52] U.S. Cl. ............................. 214/450; 214/85.5; 224/42.1 H
[51] Int. Cl.² ......................................... B60R 9/00
[58] Field of Search ................. 214/500, 450, 85.5, 214/517, 75 R, 75 H; 224/42.1 H

[56] References Cited
UNITED STATES PATENTS

| | | | |
|---|---|---|---|
| 2,715,974 | 8/1955 | Nest | 214/450 |
| 3,608,759 | 9/1971 | Spurgeon et al. | 214/450 |
| 3,612,314 | 10/1971 | Cooper | 214/450 |
| 3,823,839 | 7/1974 | Petzing et al. | 214/450 |
| 3,905,499 | 9/1975 | Speidel | 214/450 |

*Primary Examiner*—Frank E. Werner
*Assistant Examiner*—Lawrence J. Oresky
*Attorney, Agent, or Firm*—Huebner & Worrel

[57] ABSTRACT

A boat handling apparatus particularly suited for use in stowing boats aboard overland vehicles. The apparatus is characterized by a first windlass adapted to be mounted atop an overland vehicle having a hoisting line adapted to be connected to the bow of a boat positioned in spaced relation with the vehicle, below the level of the windlass, for advancing the boat along an arcuate path into a received relationship atop the vehicle, and a second windlass adapted to be mounted in juxtaposition with the first windlass and characterized by a pair of hoisting lines adapted to be connected to the stern of the boat for supporting the boat in suspension as it is advanced along said arcuate path and for thereafter advancing the boat along a linear path into a stowed relationship with the vehicle.

11 Claims, 15 Drawing Figures

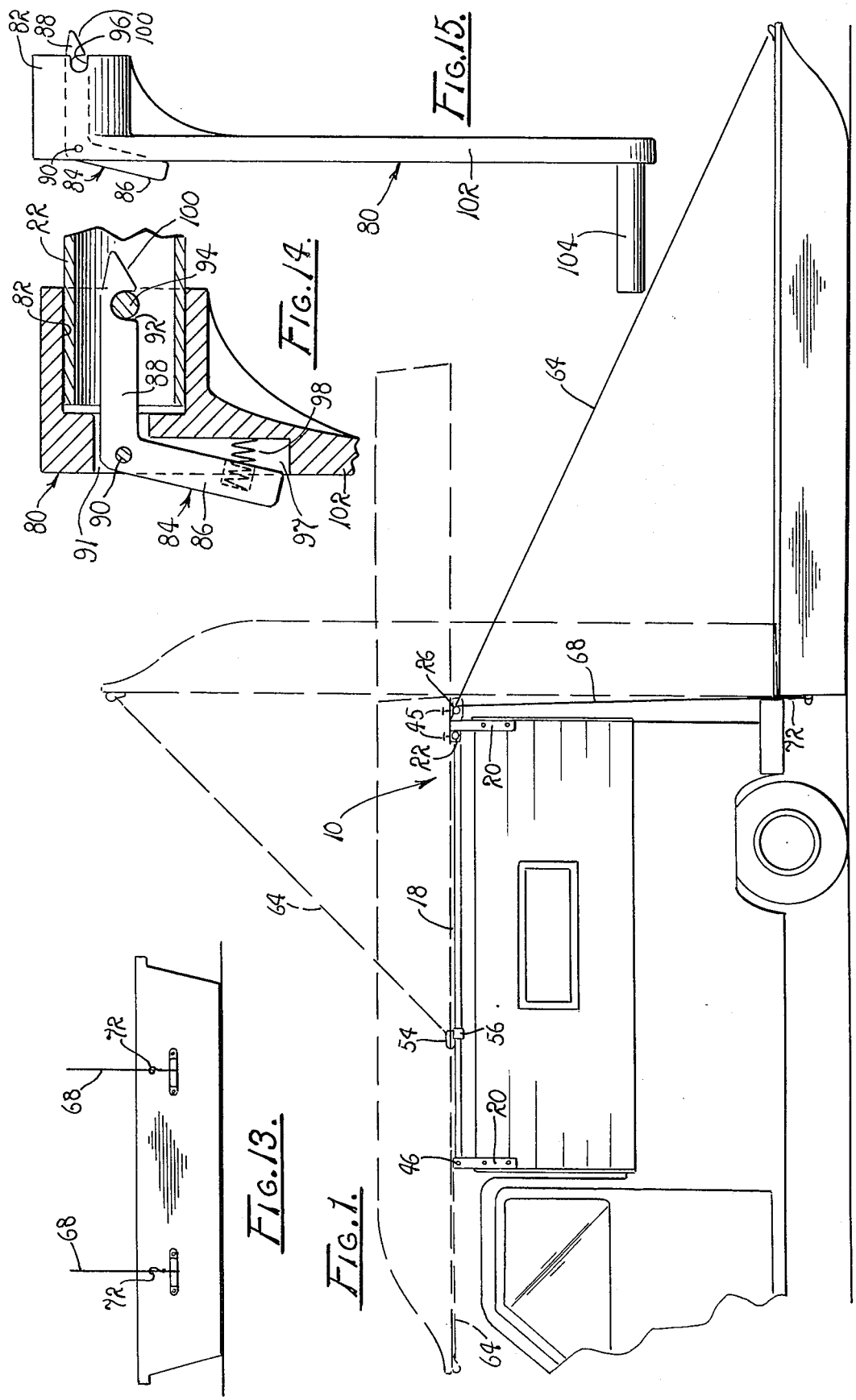

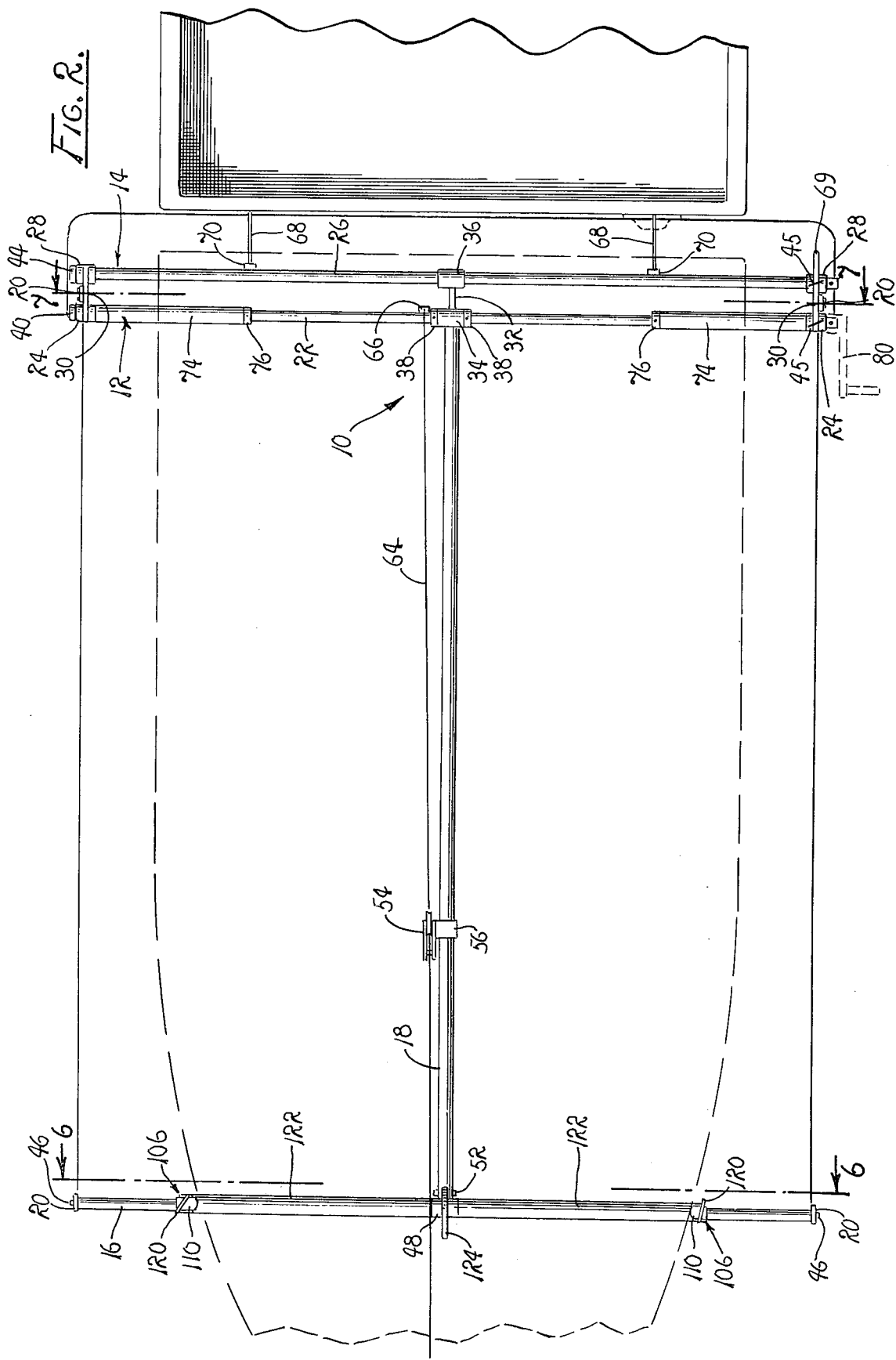

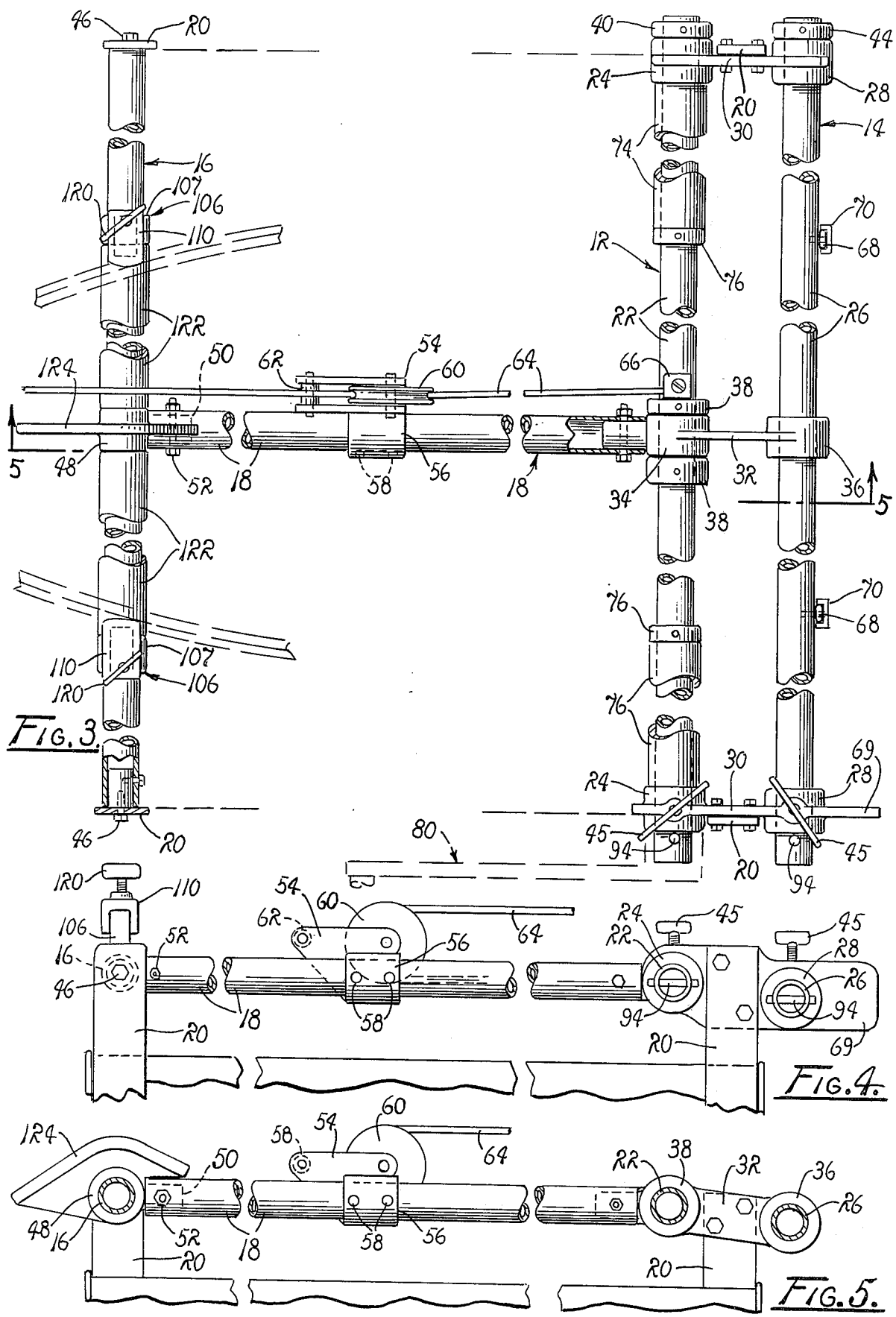

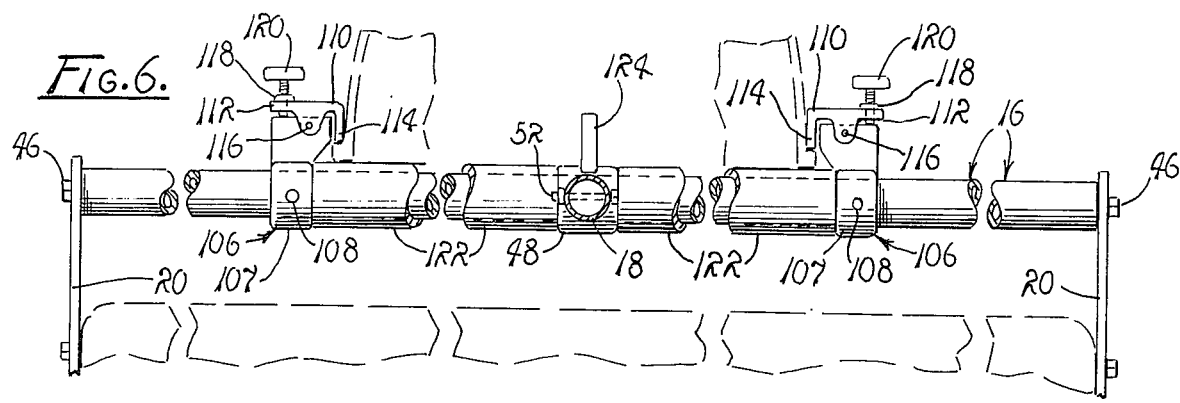
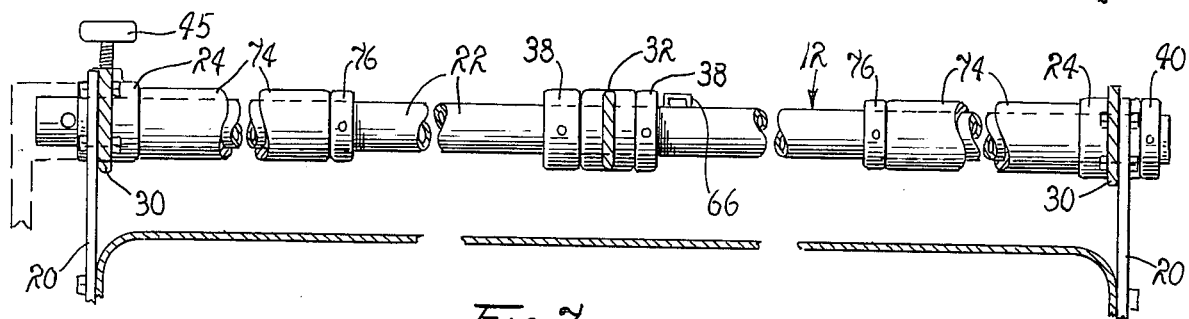
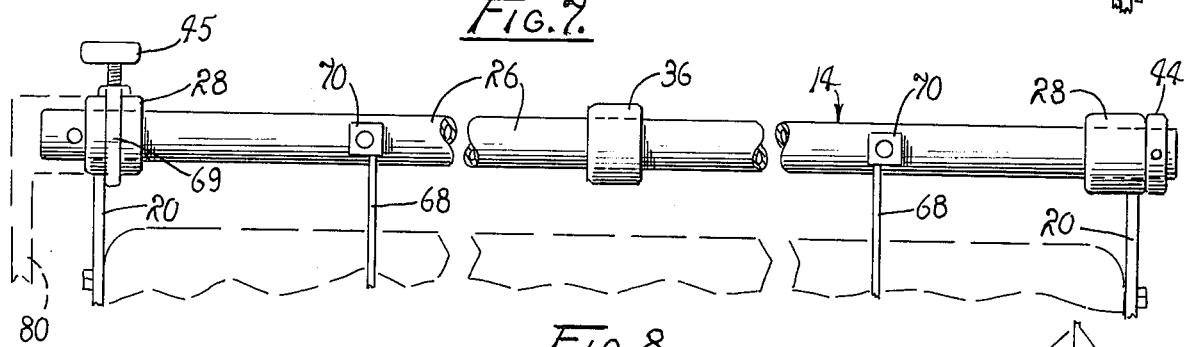
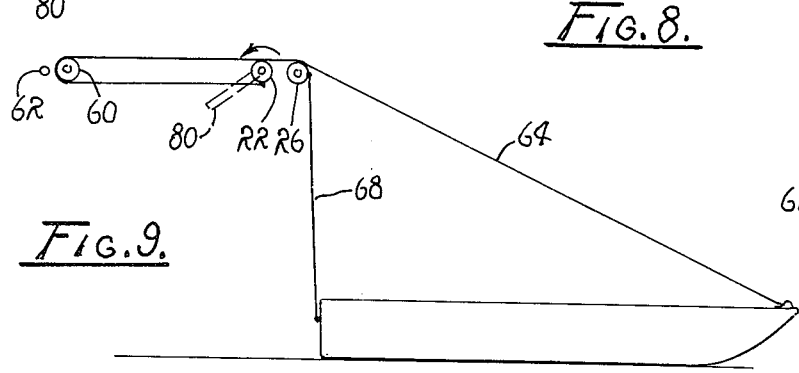
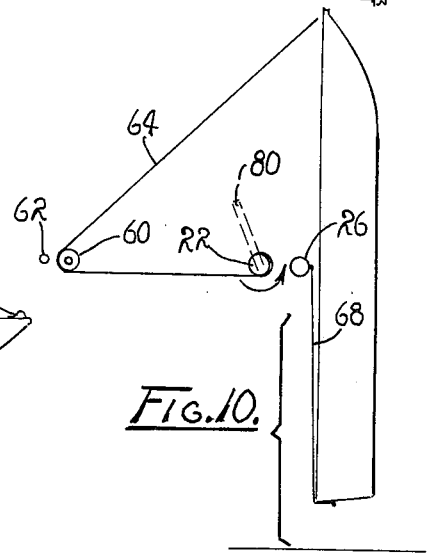
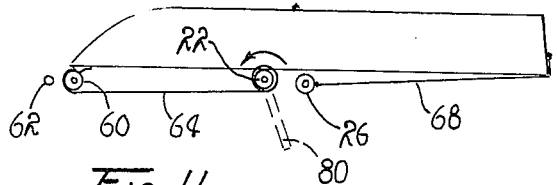
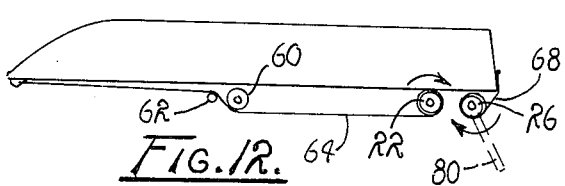

ly to a boat handling apparatus particularly suited for use in stowing small boats atop overland vehicles such as campers, RV's (Recreational Vehicles), station wagons, and the like.

BOAT HANDLING APPARATUS FOR STOWING BOATS ABOARD OVERLAND VEHICLES

BACKGROUND OF THE INVENTION

1. Field of the Invention

The invention generally relates to a boat handling apparatus and more particularly to a boat handling apparatus particularly suited for use in stowing small boats atop overland vehicles such as campers, RV's (Recreational Vehicles), station wagons, and the like.

As can be appreciated by those familiar with activities wherein a use of small boats is considered desirable, such as fishing, duck hunting, and the like, a capacity for transporting a small boat atop a camper, RV, station wagon, or the like, between various locations often is deemed to be essential for achieving success.

2. Description of Prior Art

Often commercially available boats are of so-called lightweight materials and are loaded atop overland vehicles by two or more persons working together thereafter to place the boats in an inverted orientation atop the vehicles. The boats are thereafter unloaded in a similar fashion. However, even those boats formed of lightweight materials are bulky, often difficult to handle, and frequently are much too heavy for a single person to lift and handle during loading and unloading operations.

In order to overcome the aforementioned difficulties encountered in loading and unloading boats atop overland vehicles, various types of apparatus employing rigging particularly designed for hoisting the boats. Often such apparatus includes a complex arrangement of windlasses driven by motors, both electrical and hydraulic, for hoisting the boats aboard vehicles thus equipped. Unfortunately, usage of apparatus of these types is severly impeded due to various factors including expense, complexity, weight, bulkiness and lack of overall efficiency.

For example, one apparatus heretofore suggested for use in loading and unloading boats relative to overland vehicles, includes a single windlass adapted to be mounted atop a vehicle, near the rear thereof, having a pair of lines adapted to be connected with handles normally found on the transom of boats, and another pair of lines extended from the windlass, over a direction-reversing roller located near the forward portion of the top of the vehicle, and connected to the gunwales of the boat, forward of the midsection thereof, so that as the motor is activated for driving the windlass, the lines connected to the transom support the boat in suspension while the other pair of lines serves to advance the boat along an arcuate path into a received relationship atop the vehicle and thereafter serves to pull the boat forward into a seated relationship with the windlass, with the lines connected to the transom being slacked until stowed. In order to unload the boat employing this apparatus, the direction of drive for the motor is reversed so that the windlass is driven in a reverse direction and serves to push the boat rearwardly in response to frictional engagement thereof with the boat, until the center mass of the boat is moved rearwardly of the vehicle, whereupon the boat is permitted to pivot downwardly until suspended by the lines connected with the transom thereof and supported by the other pair of lines. Such an apparatus is, of course, somewhat complex and fails to achieve and maintain complete positive control of the boat as it is being handled and thus the apparatus lacks a desired degree of simplicity, economic desirability, and overall efficiency.

It is, therefore, the general purpose of the instant invention to provide a simplified, economic and practical manually operable apparatus adapted to be mounted atop an overland vehicle and readily and efficiently employed in loading boats in stowed configurations, and thereafter employed in unloading the boats into discharged configurations, for purposes of storage or subsequent usage.

OBJECTS AND SUMMARY OF THE INVENTION

It is, therefore, an object of the instant invention to provide an improved boat handling apparatus particularly suited for use in stowing boats atop overland vehicles.

It is another object to provide an improved manually operable apparatus for use in loading and unloading boats relative to overland vehicles employed in the portage thereof.

Another object is to provide an improved, economic, and simplified apparatus adapted to be mounted atop overland vehicles and readily employed in manually loading boats into stowed configurations atop vehicles, and thereafter employed in unloading the boats into discharged configurations in which the boats are readied for subsequent stowage or usage.

It is another object to provide an improved, economic, and simplified manually operable apparatus adapted to be mounted atop a vehicle and employed for removing a boat from a body of water and depositing the boat in a stowed configuration atop the vehicle, and thereafter employed in lowering the boat from its stowed configuration into a discharged configuration on the surface of a body of water on which the boat is to be used.

Another object is to provide an improved boat handling apparatus which is particularly useful in connection with the loading and unloading of recreational boats relative to overland vehicles, although not necessarily restricted in use thereto, since the apparatus may be employed in storing boats on stationary structures found near the body of water on which the boat is used.

Another object is to provide an improved, manually operable apparatus including a pair of windlasses, two lines being attached to one windlass and one line being attached to the other windlass of the pair for use in boat handling operations, wherein boats are stowed atop overland vehicles, and thereafter discharged, and adapted to achieve and maintain positive control of the boat during both stowing and discharging operations.

These and other objects and advantages are achieved through the use of a boat handling apparatus which includes a pair of windlasses adapted to be mounted in juxtaposition above the level of a boat to be handled, a crank handle adapted to be mated with each of the windlasses for accommodating a manual operation thereof, a line extended from a first one of the windlasses about a direction-reversing sheave and adapted to be connected to the bow of a boat to be hoisted, and a pair of lines extended from the second windless of the pair and adapted to be connected with the stern of the boat having a length sufficient to suspend the boat as the boat is advanced along an arcuate path in response to rotary motion imparted to the first windlass by a manipulation of the crank handle and, thereafter, wound about the second windlass for advancing the boat in a linear path into a stowed relationship atop the vehicle, as will become more readily apparent by reference to the following description and claims in light of the accompanying drawings.

BRIEF DESCRIPTION OF THE DRAWINGS

FIG. 1 is a fragmented side elevation of an overland vehicle having mounted thereon a boat handling apparatus which embodies the principles of the instant invention, illustrating, in phantom, one manner in which the apparatus is employed in handling small boats.

FIG. 2 comprises a top plan view of the apparatus illustrating, in phantom, a position assumed by a boat supported in a stowed configuration by the apparatus.

FIG. 3 is a fragmented to plan view, similar to FIG. 2 but on an enlarged scale.

FIG. 4 is a fragmented side elevation of the apparatus.

FIG. 5 is a side elevation of the apparatus, taken generally along line 5—5 of FIG. 3.

FIG. 6 is a fragmented, partially sectioned view, taken generally along line 6—6 of FIG. 2.

FIG. 7 is a partially sectioned view, taken generally along line 7—7 of FIG. 2.

FIG. 8 is a fragmented end elevation of the apparatus.

FIGS. 9, 10, 11 and 12 collectively illustrate the manner in which the boat handling apparatus of the instant invention is employed in loading a boat atop an overland vehicle.

FIG. 13 comprises an end view of the stern of a boat connected with the boat handling apparatus of the instant invention through a pair of lines connected to a pair of handles attached to the transom of the boat.

FIG. 14 comprises a cross-sectional view of the socket portion of a crank handle provided for manually operating the boat handling apparatus, more particularly illustrating the mechanism provided for coupling the crank handle with a barrel of each windlass provided for the apparatus, as illustrated in FIG. 2.

FIG. 15 comprises a side elevational view of the crank handle.

DESCRIPTION OF THE PREFERRED EMBODIMENT

Referring now to the drawings, with more particularity, wherein like reference characters designate like or corresponding parts throughout the several views, there is shown in FIG. 1 an overland vehicle having mounted at the top thereof a boat handling apparatus, generally designated 10, which embodies the principles of the instant invention.

While the boat handling apparatus 10 is shown mounted atop a camper, it should readily be apparent, the apparatus 10 has utility when employed with other vehicles including RV's, station wagons, and the like. Moreover, the apparatus 10 has utility when employed on other structures including storage racks and the like disposed in close proximity with a body of water on which the boat is to be used.

As best illustrated in FIG. 2, the apparatus 10 includes a pair of windlasses, not designated, consisting of a first windlass 12, and a second windlass 14. The pair of windlasses is interconnected with a transverse support beam 16, through a tubular beam 18. This beam serves as a longitudinal support member and interconnects the support beam 16 and the windlasses 12 and 14 into a relatively rigid framework, not designated.

It is to be understood that the apparatus 10 is, when operative, mounted atop a vehicle and connected therewith through suitable supporting structure, including risers 20 which, where so desired, are bolted directly to the vehicle. However, as should readily be apparent, where so desired, the risers 20 can be mounted on suitable straps adapted to extend transversely across the top of the vehicle and connected therewith for supporting the risers 20 in an upright disposition. In such instances, the straps are coupled to the vehicle in a suitable fashion, not shown.

The windlasses 12 and 14 are of similar designs. As shown, the windlass 12 includes a barrel 22 extended through a pair of journal bearings 24, located at the opposite ends thereof and supported for rotation thereby. Similarly, the windlass 14 includes a barrel 26 extended through a pair of journal bearings 28 located at the opposite ends thereof and supported for rotation thereby. Extended in a coupling relationship between the journal bearings 24 and 28, located at each of the opposite ends of the pair of windlasses, there is a rigid connection link 30 which serves to connect the ends of the windlasses 12 and 14 in an integrated relationship. Moreover, each of the connecting links 30 is united with a riser 20 through suitable fasteners, including bolts, not designated. It will, therefore, be understood that each of the barrels 22 and 26 is supported for rotation at each of its opposite ends through a pair of journal bearings rigidly affixed to and supported by a pair of risers 20, located at opposite sides of the top of the vehicle and connected thereto.

As a practical matter, the barrels 22 and 26 also are interconnected, near the midportions thereof, through a rigid connecting link 32. This link terminates at its opposite ends in a pair of journal bearings, designated 34 and 36, concentrically related to the barrels. Thus, the connecting link 32 also serves to maintain the barrels 22 and 26 in parallelism during operation of the apparatus 10.

Concentrically related to the barrel 22, at opposite sides of the journal bearing 34, there is a pair of collars 38, while a third collar 40 is mounted at one end of the barrel in a snugged relationship with an adjacent journal bearing 24 for supporting the barrel 22 against axial motion. For similar purposes, a collar 44 is affixed to one end of the barrel 26 in a snugged relationship with the journal bearing 28 for restraining the barrel against axial displacement as rotary motion is imparted thereto. While collars, designated 38 and 44, are provided for preventing axial motion of the barrels 22 and 26, during operation of the boat handling apparatus, it is to be understood that any suitable means can be employed for this purpose. Moreover, while not shown, it should be apparent that, where desired, an additional collar is secured in a concentric relationship with the barrel 26 and seated in an abutted relationship with another one of the journals 28 and 36 for further releasing the barrel against axial displacement.

In order to substantially restrain the barrels 22 and 26 against rotation, there is provided a pair of setscrews 45 screw threaded through a pair of adjacent journal bearings 24 and 28. Each of the setscrews includes a wing for facilitating manipulation so that the setscrews may be tightened, as desired, for securing the barrels against rotary motion, in a known manner.

The transverse support beam 16 also is supported at each of its opposite ends by a riser 20, FIG. 6. As presently employed, the support beam 16 comprises a tubular body having a plug, not shown, axially inserted in each of its opposite ends. Each of the plugs includes a threaded bore for receiving therein a screw 46 extended through the uppermost end of one of the risers 20. Thus the risers 20 and the support beam 16 are interconnected by the screws 46.

Additionally, there is provided a sleeve 48 concentrically received by the barrel 16, at the midportion thereof, and connected with the beam 18 in a suitable manner. For example, as shown, to the sleeve 48 there is affixed an orthogonally related sleeve 50 which is, in turn, telescopically received within one end of the tubular beam 18, and connected thereto through a bolt 52 extended diametrically therethrough. The beam 18 is connected with the journal bearing 34, where so desired, in a similar manner employing a similar sleeve, not designated, affixed to the journal. It is to be understood that the beam 18 serves to maintain a desired spatial relationship between the windlass 12 and the support beam 16, consequently, it should be apparent that, where desired, the beam 18 is provided with a coupling, not shown, adapted to be adjusted for varying the spatial relationship between the windlass 12 and the support beam 16.

Also, mounted on the longitudinal beam 18, between the opposite ends thereof, there is a bracket, designated 54. The bracket 54 includes a tubular body 56 through which is axially extended the beam 18. A setscrew 58 is provided for selectively securing the sleeve body 56 in place, relative to the longitudinal beam 18, thus adjustment of the spatial relationship between the bracket 54 and windlass 12 is facilitated.

The bracket 54 serves as a mount for a pair of sheaves, including a major sheave 60 and a minor sheave 62 mounted in a coplanar relationship, the purposes of which will hereinafter become more readily apparent.

As best shown in FIG. 2, a hoisting line 64, having one end affixed to the barrel 22, is extended from the barrel upwardly between the sheaves 60 and 62. Thus, the hoisting line is at all times disposed in traversing relationship with a peripheral portion of the major sheave 60. The purpose served by the major sheave 60 is that of reversing the direction of the hoisting line 64 as it is extended to and connected with the bow of a boat located beneath the level of the windlass 12, immediately at the rear of the vehicle, as best illustrated in FIG. 1.

It is here noted that the hoisting line 64 preferably includes a snap, not shown, adapted to connect the distal end of the hoisting line with a bracket affixed to the prow of the boat to be loaded. The hoisting line 64 is, of course, connected to the barrel 22 through any suitable means, such as a clip 66 attached to the barrel through a use of a bolt, not designated, passed diametrically through the barrel 22. It will, therefore, be appreciated that as the barrel 22 is driven in rotation, the hoisting line 64 is wound thereabout for thus shortening the effective length of the hoisting line.

Connected to the barrel 26, at opposite sides of the journal bearing 36, there is a pair of hoisting lines, each being designated 68. These lines are connected with the barrel 26 through a pair of suitable clips 70, affixed to the barrel 26 by suitable bolts, not designated. The opposite ends of each of the hoisting lines 68 includes a hook 72, FIG. 13, which permits the hoisting line 68 to be passed through U-shaped handles, not designated, projected from the transom of the boat to be hoisted aboard the vehicle by the apparatus 10. Of course, the particular hook employed is varied as desired. Moreover, where desired, a line guide 69 is provided near one end of the barrel 26 to avoid fouling of the line 68 through inadvertent movement of the line during operation.

Concentrically related to the barrel 22, near each of its opposite ends, FIG. 7, there is a sleeve 74 formed of PVC (polyvinyl chloride) which is freely rotatable relative to the barrel. A suitable collar 76, of an annular configuration, is mounted on the barrel 22 in close proximity with the adjacent end of the sleeve 74 and serves to support the sleeve 74 against axial displacement as rotary motion is imparted to the barrel. Thus, the sleeve 74 is supported for rotation relative to the barrel as frictional engagement with the adjacent surface of the boat being handled is established, as will hereinafter become more readily apparent.

In order to impart rotary motion to the barrels 22 and 26, there is provided a crank handle, generally designated 80, FIG. 15, having a socket 82 provided within one end thereof for alternatively receiving one end of each of the barrels. The socket 82 is of a cup-shape configuration and includes a pivotal pawl 84 mounted therein. The pawl includes angularly related segments 86 and 88, and is supported for pivotal displacement by pivot pin 90 interposed between the segments 86 and 88. The segment 88 of the pawl 84 is extended axially through an opening 91 formed in the socket 82 and includes a relief 92 located near the distal end thereof. The relief 92 comprises a notch configured to receive therein a pin 94 extended diametrically through each of the barrels 22 and 26 in close proximity with the outermost ends thereof.

It is important to note that the wall of the socket 82 is provided with a pair of diametrically aligned reliefs 96, comprising notches aligned with the relief 92 for receiving therein projected end portions of the pin 94. Thus, a pin 94 is received simultaneously by the reliefs 92 and 96 when the crank handle 80 is attached to either of the windlasses.

The segments 86 and 88 of the pawl 84 are angularly related in a manner such that the longitudinal axes thereof intersect to define an included angle greater than 90°. Consequently, through this angular relationship of the segments 86 and 88, pivotal motion of the pawl is accommodated in order to accommodate oscillatory motion of the segment 88. Moreover, it is important to note that the planar surface of the crank handle 80, adjacent the socket 82, is provided with a slotted relief 97 for receiving therein the segment 88 of the pawl 84, while a compression spring 98 is interposed between the bottom of the relief 97 and the outermost end of the segment 86 for continuously biasing the pawl in pivotal displacement about the pivot pin 90. Thus, the segment 88 of the pawl 84 is normally biased into coaxial alignment with the socket 82. The distal end of the segment 88 is provided with a cam surface, designated 100, which permits the distal end of the segment 88 to be lifted by the pin 94 as engagement between the cam surface 100 and the pin 94 is effected during a coupling of the crank handle with a windlass. A coupling of the crank handle 80 with either of the windlasses 12 and 14 is achieved by inserting the end portion of the barrel thereof into the socket 82, with the pin 94 thereof being disposed in a coplanar relation with the reliefs 92 and 96.

The crank handle 80 is further provided with an elongated body 102 having an orthogonal handle 104 provided at the end thereof opposite the socket 82. The handle 104 facilitates manipulation of the crank handle in a manner well understood by those familiar with such devices.

Located in spaced relation, near opposite ends of the support beam 16, there is provided a pair of clamping brackets 106, the purpose of which is to secure a boat in a stowed relationship with the vehicle upon which the apparatus 10 is mounted. Each of the brackets 106 includes a tubular body 107 through which is extended the support beam 16. A conventional setscrew 108 is threaded diametrically into each of the bodies 107 for selectively securing the related bracket in place, relative to the support beam. Mounted on each of the brackets 106 there is a pivotal clamping pawl 110, the purpose of which is to engage the peripheral chine of a stowed boat. The pawl 110 includes a base segment 112 and a distal segment 114 extended at substantially right angle from the segment 112. A pivot pin 116 extended through the segment 112 is provided for coupling each pawl to the related body 107 and serves a fulcrum for supporting the pawl for pivotal displacement in a vertical plane.

At the end of the segment 112, opposite the angularly related segment 114, there is a screw-threaded opening 118 having axially inserted therein an adjustable thumb screw 120. The mass of the thumb screw 120 is such that the pawl 110 is continuously biased in rotation about the pivot pin 116, in a direction such that the segment 114 is urged toward an elevated relationship with respect to the adjacent surface of the support beam 116. However, through a manipulation of the thumb screw 120, for thus threadedly advancing the thumb screw downwardly through the opening 118, the thumb screw is caused to engage a horizontal surface, not designated, provided on the bracket 106. Continued manipulation of the thumb screw forces the pawl to move in a direction such that the segment 114 moves downwardly. Thus, a clamping relationship is established for the adjacent surfaces of the support beam 16 and the lowermost end of the segment 114 of the pawl 110. Thus it is possible to clamp, in a vise-like fashion, the peripheral chine which circumscribes the upper surfaces of a stowed boat, beneath the segment 114.

It should be apparent that by manipulating the thumb screws 120 in a direction such that the thumb screws are extracted upwardly, relative to the brackets 106, the pawl 110 is released to pivot in response to the mass of the thumb screws 120 for thus lifting the segments 114 of the pawl 110, whereby the peripheral chine of the boat is released and the clamping brackets are configured for accommodating displacement of the boat along a linear path.

In order to enhance motion of a boat along a linear path extended across the surface of the beam 16 in a direction transversely related to the longitudinal axis thereof, there is mounted on the beam a pair of axially spaced, rotatable sleeves 122 which serve as bearings for facilitating motion of the boat. Also, it is noted that a ramp 124 is affixed to the sleeve 48 and serves as a bearing surface for lifting the prow of the boat, as the boat is moved along a linear path and caused to pass thereover, in order to assume that the bracket affixed to the prow does not engage the beam 16 in a manner such that a binding relationship is established therebetween.

OPERATION

It is believed that in view of the foregoing description, the operation of the apparatus will readily be understood and it will be briefly reviewed at this point.

With the boat handling apparatus 10 assembled in the manner hereinbefore described, and mounted atop an overland vehicle, such as a camper, RV, or the like, the apparatus is readied for use in stowing a boat for portage atop the vehicle simply by releasing the thumb screws 45 for releasing the barrels of the windlasses 12 and 14, and the thumb screws 120 for permitting the clamping pawls 110 to open as the segment 114 is pivoted upwardly in response to the weight of the thumb screw.

Stowage of the boat is effected by first turning the boat in its upright position with the transom thereof being positioned in close juxtaposition with the rear of the vehicle. The thumb screws 45 are released and the hoisting lines 68 thereafter paid out from the barrel 26 and connected to handles normally provided on the transom of the boat, utilizing the hooks 72. As a practical matter, the lengths of the hoisting lines 68 are such that the boat is supported in suspension thereby. The hoisting line 64 is then paid out from the barrel 22, about the major sheave 60, and connected at its distal end to a bracket provided at the prow of the boat, FIG. 9.

The crank handle 80 is then connected with the barrel 22, of the windlass 12, by inserting the projected end of the barrel 22 into the socket 82 with the pin 94 of the barrel being in coplanar relation with the reliefs 92 and 96. As the end of the barrel 22 is inserted into the socket 82, the cam surface 100 engages the pin 94 and causes the pin to pivot against the applied force of the spring 98, in a direction sufficient for permitting the relief 92 to advance into a mated relationship with the pin 94, as a pawl is urged to rotate by the compression spring 98, acting about the pivot pin 90.

The crank handle 80 is then manipulated for imparting rotary motion to the barrel 22 of the windlass 12 for thus causing the hoisting lines 64 to be wound about the barrel, whereupon the bow of the boat is lifted, so that the boat is caused to move in a pivotal fashion, along an arcuate path into a vertical disposition, as illustrated in FIG. 10. Once the vertical disposition for the boat is achieved, a continued manipulation of the crank handle 80 causes the boat to pivotally advance toward an inverted disposition, FIG. 11, and thereafter advance along a linear path a distance sufficient for positioning the center of mass above the vehicle, FIG. 11. The handle 80 is then uncoupled from the barrel 22, simply by depressing the segment 86 of the pawl 84 against the force of the spring 98, for disengaging the relief 92 from the pin 94, whereupon the handle is released for accommodating removal thereof from the end of the barrel.

The crank handle 80 is then coupled with the barrel 26, in a manner similar to that described with respect to that in which the handle was connected with the barrel 22. Rotary motion now is imparted to the barrel 26, through a manipulation of the handle for thus causing the hoisting lines 68 to be wound about the barrel 26, as illustrated in FIG. 9. As the hoisting lines 68 are wound about the barrel 26, a shortening of these lines occurs while the line 64 is again paid out. The boat is thus forced to advance along a linear path toward a stowed disposition as it is supported by the sleeves 74 and 122, FIG. 12.

Due to the fact that the barrel 26 is at a level slightly lower than that of the barrel 22, frictional engagement of the boat with the barrel 26 is avoided although the boat is supported by the barrel 22 through rolling engagement with the sleeves 74 and the beam 16 through rolling engagement with the sleeves 122. Of course, as the bow portion of a boat is advanced along the rotatable sleeves 122, the peripheral chines of the boat are caused to assume a position immediately beneath the segment 114 of the clamping pawls 110. A subsequent selective manipulation of the thumb screws 120 serves to pivot the pawls 110 into a clamping engagement with the chine of the boat for thus securing the boat in place.

Of course, as the boat is advanced along its linear path, in response to rotation imparted to the barrel 26, of the windlass 14, the hoisting line 64 is caused to assume a trained position about a portion of the periphery of the minor sheave 62, as illustrated in FIG. 9, thus a fouling of the line is avoided. Moreover, the ramp 124 serves to assure that the bracket affixed to the boat's prow clears the beam 16 as the prow passes thereover.

Once the bow portion of the boat is seated beneath the clamping pawls 110, the boat has assumed its stowed configuration. The thumb screws 45 and 120 now are tightened for securing the barrels 22 and 26 against rotation and for clamping the chine of the boat in the clamping pawls 110.

In order to unload, or discharge, the boat, a single operator merely reverses the operation heretofore described. This is achieved by first releasing the thumb screws 45 and 120, coupling the crank handle 80 with the projected end of the barrel 22 of the windlass 12 and again winding the hoisting line 64 about the barrel, for thus causing the boat to advance rearwardly, or in a direction toward the windlass. Rearward advancement continues until the boat reaches a point such that the center of mass of the boat is positioned beyond the end of the vehicle, whereupon the boat experiences displacement along a pivotal path as a controlled unwinding of the hoisting line 64 from the barrel 22 continues for lowering the boat until a vertical disposition is assumed. Of course, once the hoisting lines 68 are fully paid out, continued rotation of the barrel 22 permits the hoisting line 64 to be paid out for permitting the boat to again pivot to a horizontal disposition, while the stern is suspended by the hoisting lines 68. As the boat comes to rest on the ground, or on the surface of a body of water, tension is relieved in the hoisting line 64. The boat is then released from the hoisting lines 64 and 68 and thus made ready for usage.

Of course, the hoisting lines 64 and 68 are then rewound into a stowed configuration about the barrels 22 and 26, respectively.

In view of the foregoing, it should readily be apparent that the apparatus of the instant invention provides a practical solution to the perplexing problem of loading and unloading boats for stowage purposes atop overland vehicles used for portage purposes.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. In a boat handling apparatus particularly suited for use in stowing boats aboard overland vehicles, the improvement comprising:
first means including a first windlass adapted to be mounted atop an overland vehicle and characterized by a first hoisting line adapted to be connected to the bow of a boat positioned in spaced relation therewith and below the level thereof for advancing the boat along an arcuate path into a received relationship atop said vehicle, and second means including a second windlass adapted to be mounted atop said vehicle in juxtaposition with said first means and characterized by at least a second hoisting line adapted to be connected to the stern of the boat for advancing the boat along a linear path into a stowed relationship with said vehicle.

2. The apparatus of claim 1 wherein said second hoisting line is characterized by a length sufficient for supporting said boat in suspension as the boat is advanced along said arcuate path.

3. The apparatus of claim 2 wherein each windlass is further characterized by a rotatable barrel transversely related to said linear path and supported for rotation near one end of said vehicle.

4. The apparatus of claim 3 wherein said first means further comprises a sheave adapted to be mounted in spaced relation with said first windlass having said first hoisting line trained about a peripheral portion thereof.

5. The apparatus of claim 4 further comprising means for selectively securing each of said barrels against rotation and manually operable means for imparting selective rotation to said barrels.

6. The apparatus of claim 5 further comprising a pair of laterally spaced, manually operable clamps mounted in spaced relation with said first windlass for selectively securing said boat in a stowed relationship with said vehicle.

7. The apparatus of claim 3 further comprising a crank handle and means for releasably connecting the crank handle to one end of each of said barrels.

8. The apparatus of claim 7 wherein said means for releasably connecting the crank handle to one end of each of said barrels includes a rigid pin extended diametrically through said one end of each of said barrels, socket means including a cup adapted to be telescopically received by said one end of each of said barrels, and means including a pivotally supported spring-loaded locking pawl extended axially through said cup for engaging the rigid pin of each of said barrels in an interlocking relationship, as said one end of each of said barrels telescopically receives said socket means.

9. In combination with an overland vehicle a boat handling apparatus for stowing recreational boats atop supporting structure comprising:
A. a first windlass having a first rotatable barrel mounted atop said structure and characterized by a single hoisting line attached at one end thereof to said first barrel, and adapted to be connected at the opposite end thereof to the prow of a boat positioned beneath the level of the windlass and in spaced relation with the structure for advancing the boat along an arcuate path into a received relationship atop the structure;
B. a second windlass having a second barrel mounted atop said structure in juxtaposition with said first barrel characterized by a pair of hoisting lines attached at one end thereof to said second barrel and adapted to be connected at the opposite ends thereof to the stern of said boat;
C. a sheave mounted in horizontally spaced relationship with said first and second barrels having said first hoisting line trained about a peripheral portion thereof;
D. a crank handle adapted to be releasably received alternatively by said first and second barrels, through which each of the barrels of said first and second windlass is afforded manual rotation for effectively shortening the hoisting lines attached thereto; and
E. locking means for selectively locking the barrels of each of the windlasses against rotation.

10. The apparatus of claim 9 further comprising means including a transversely oriented beam mounted atop said structure in spaced parallelism with said first and second windlasses for supporting the forward portions of the boat when the boat is in a stowed relationship atop said structure, means including a pair of mutually spaced, manually operable clamps mounted in spaced relation on said beam for receiving a peripheral chine projected from the boat, and means including an elongated beam for interconnecting said transversely oriented beam with said first and second windlass.

11. The apparatus of claim 10 wherein each of said clamps comprises a pawl supported for pivotal displacement in a vertical plane between an elevated and depressed disposition, including a mass normally supporting said pawl in its elevated disposition, and a thumb screw for supporting the pawl in its depressed disposition.

* * * * *